Figure 1:
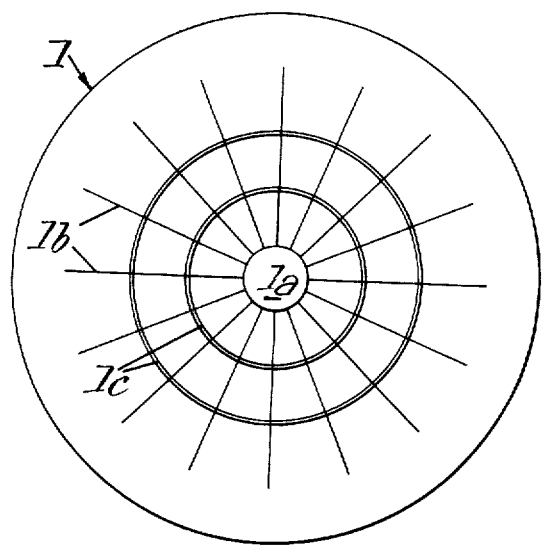

United States Patent [19]
Bourne

[11] 3,888,042
[45] June 10, 1975

[54] ROOT-BALL WRAPPINGS FOR THE PLANTATION OF PLANTS AND METHODS FOR THEIR MANUFACTURE

[76] Inventor: Henri Jacques Bourne, 38 Jarcieu, France

[22] Filed: May 24, 1973

[21] Appl. No.: 363,566

[30] Foreign Application Priority Data
June 23, 1972 France .................... 72.22771

[52] U.S. Cl. .................... 47/37; 47/DIG. 7
[51] Int. Cl. .................... A01c 11/00
[58] Field of Search ............ 47/34, 34.11, 37, 37.1, 47/37.2, DIG. 7; 150/DIG. 1; 206/46 PL; 229/1.5 B; 161/150

[56] References Cited
UNITED STATES PATENTS

| | | | |
|---|---|---|---|
| 1,964,887 | 7/1934 | Lovett | 47/34.11 |
| 1,988,886 | 1/1935 | Wilson | 47/34.11 |
| 1,994,962 | 3/1935 | Rushfeldt | 47/34.11 |
| 2,097,929 | 11/1937 | Lovett | 47/34.11 |
| 2,810,989 | 10/1957 | Terry | 47/34 |
| 2,958,593 | 11/1960 | Hoover et al. | 51/295 |
| 2,962,158 | 11/1960 | Struthers | 206/46 FR |
| 3,174,940 | 3/1965 | Lacoste | 47/34 X |
| 3,199,275 | 8/1965 | Fesco | 229/1.5 B X |
| 3,282,868 | 11/1966 | Frysinger et al. | 47/37 X |
| 3,550,318 | 12/1970 | Remke et al. | 47/37 |

FOREIGN PATENTS OR APPLICATIONS

| | | | |
|---|---|---|---|
| 1,597,853 | 6/1970 | France | 47/37 |
| 513,971 | 11/1930 | Germany | 47/34 |
| 619,085 | 9/1935 | Germany | 47/34 |
| 1,186,730 | 4/1970 | United Kingdom | 47/37 |

*Primary Examiner*—Edgar S. Burr
*Assistant Examiner*—Paul T. Sewell
*Attorney, Agent, or Firm*—Larson, Taylor & Hinds

[57] ABSTRACT

The root-ball wrapping is constituted of a material formed by a non-woven material, and has a shape and size determined so that, when the root-ball rests on the central zone of the wrapping, the peripheral zone of said wrapping can be turned up around a root-ball and against the latter so as to mate the shape of the root-ball and to surround the stem-base of the plant. The wrapping if fixed by means of a flexible tie, binding said peripheral zone at the level of the stem-base of the plant.

8 Claims, 3 Drawing Figures

PATENTED JUN 10 1975 3,888,042

ROOT-BALL WRAPPINGS FOR THE PLANTATION OF PLANTS AND METHODS FOR THEIR MANUFACTURE

The invention relates to wrappings for enveloping root-balls of plants (plants, bushes, shrubs, trees, for example) on operations of transfer of these plants from a nursery to a final planting ground, such root-ball wrappings having the principal function of avoiding crumbling of the root-ball during transportation and handling of the plant.

The invention also relates to methods for the manufacture of such root-ball wrappings.

It would seem opportune, before describing the various features of the invention, to specify the various criteria which wrappings of this type must satisfy in order to be efficient and for simple and economic industrial exploitation.

Firstly, as regards their efficiency, that is to say their technical qualities, root-ball wrappings must, have a satisfactory multidirectional mechanical strength, so as to avoid any disaggregation of the root-ball and to reduce the risks of tearing off the wrapping, in the operations of wrapping, of transfer and of final placing in position, must preserve this mechanical strength in a wet environment, be permeable to air and to water, and this in homogeneous manner, so that the restoration and moistening of the root-ball take place under good conditions and without preferential zones during the transfer so as to avoid risk of local fermentations, be easily capable of mating the whole surface of the root-ball whatever the shape and size of the latter, this in order to avoid dead spaces risking the starting of crumbling of the root-ball, be, if necessary, disaggregated on medium or long term in the final planting ground, so as to avoid an operation of removal of the wrapping at the site of final planting, which operation risks entraining crumbling of the root-ball, and lending itself, once placed in position in the final planting ground, to the passage of the roots or rootlets of the plant, whatever the shape, the size and the orientation of these roots or rootlets which must be able to develop freely from the root-ball of the transplanted plant, without being deformed, pinched or strangled.

As regards the industrial exploitation of such root-ball wrappings, it is desirable, in order that this exploitation may be profitable, that the wrappings be of low cost price, of light weight and of a regular dimensional characteristics for a given type of wrapping.

Now the various types of root-ball wrappings proposed hitherto (craft-made wrappings such as straw wrappings, wooden tubs and bands of jute, or industrial wrappings such as metallic or plastics grids, nets or weaves of plastic, perforated tubs or pots of plastics material) do not permit simultaneous satisfaction of the criteria of efficiency and of industrial exploitation mentioned above, these prior art wrappings all having a character of compromise allowing serious drawbacks to persist from the point of view of technical efficiency and/or of industrial exploitation.

It is a main object of the invention to overcome these faults of prior art root-ball wrappings, that is to say to provide a root-ball wrapping which satisfies simultaneously and in almost perfect manner the various criteria which have just been considered.

The root-ball wrapping, according to the invention, is characterized in that it is constituted of a base material formed by a non-woven material (generally of plastics material, for example of polyamide, polyester, polyvinyl chloride or of polyethylenes), whose shape and sizes are determined so that, when the root-ball rests on the central zone of the wrapping, the peripheral zone of said wrapping can be lifted around the root-ball and against the latter so as to mate the shape of the said root-ball and to surround the foot of the plant, the fixing of the wrapping being obtained by means of a flexible tie binding the abovesaid peripheral zone, thus lifted, to the level of the foot of the plant.

In this way, a package is formed of shape adapted to that of the root-ball, said package being strong in all directions (by reason of the multidirectional tangled structure of the cloth), permeable to air and to water in homogeneous fashion and perforated with interstices of different calibers enabling the passage of roots and rootlets of various sizes and directions.

Besides, the use of a non-woven synthetic based material enables the strength of the wrapping to be adapted to the size of the root-ball to be wrapped, such materials existing in commerce with well-defined characteristics and different degrees of strength, going for example from 80 grams per square meter (light cloths for small root-balls) to 300 grams and more per square meter (heavy cloths for large root-balls).

Preferably, the non-woven synthetic-based material used for the manufacture of the wrapping is of the "spinbonded" type, this material having the form of a cloth constituted from continuous fibers, mixed and tangled in all directions by a strong current of air in all directions and associated by thermal bonding of the contact points between fibers. Such a material will be qualified below as "non-woven synthetic with continuous heat-bonded fibers". A material of this type is manufactured in France by the Company Rhodiaceta under the trademark "BIDIM" and it is delivered in rolls of great length and of variable widths.

The heat bonding effected between the fibers avoids recourse to chemical bonding products often deleterious to the plant. Moreover, such bonding reinforces the strength of the cloth whilst ensuring the formation of meshes of very varied calibers enabling the passage of roots or rootlets of various sizes.

Taking into account the fact that the root-balls generally have a spheroidal shape, the root-ball wrapping according to the invention will preferably have, when it is flattened, an at least approximately circular shape.

In any case, the wrapping can advantageously be made to include a reinforced central bottom and, in its annular zone surrounding this bottom, radial folds leading, for the whole of the wrapping, to a frustoconic structure of the type of those of paper filters for laboratories, such a frustoconic structure with peripheral folds giving the abovesaid annular zone a certain radial elasticity or ability of expansion facilitating its intimate adaptation to the shape of the root-ball.

Besides, and especially in the case of a circular wrapping, said wrapping can advantageously be made to include radial reinforcing ribs and/or peripheral reinforcing ribs, the radial ribs being able to constitute the edges of the folds and the peripheral ribs of binding belts staggered at different levels once the wrapping has been placed in position around the root-ball.

Such reinforcing ribs are advantageously constituted by a cross-linkable or polymerizable polymer, in emulsion or in solution, which is sprayed on to the non-woven cloth along the selected line and which is then subjected to hardening treatment by drying, baking or polymerization, which treatment is carried out in a press with a mould and a countermould.

The polymer used for the formation of the reinforcing ribs may advantageously be an emulsion of vinyl acetate or of an acrylic polymer, or a solution of phenolic resin or of urea-fomaldehyde resin.

Finally, it will be possible to line the bottom of the wrapping with a moisture reserve constituted for example of a spongy material previously soaked in water capable of gradually distributing to the root-ball, the required amount of moisture for the survival of the plant during its transportation. Taking into account the foregoing, the method for the manufacture of root-ball wrappings according to the invention is characterized by the following successive operations:

Cutting out, in a cloth of non-woven material (preferably with thermally bonded continuous fibers) of an approximately at least circular blank, the formation preferably, of local reinforcement such as a reinforced bottom and radio and/or coaxial peripheral ribs, and, advantageously, formation of radial folds creating available surfaces adapted to enable, by extension, intimate adaptation of the wrapping to the shape of the root-ball.

Preferably, the local reinforcements, when such are provided, are formed by spraying or transfer, along the zones or lines desired, of a cross-linkable polymerizable polymer, this spraying or transfer being followed by a hardening treatment of the reinforced lines (drying, baking or hot polymerization in a heating press with a mould and countermould) if necessary preceded by drying in a tunnel.

In any case and whatever the embodiment adopted, there is finally provided a root-ball wrapping which is simple, efficient, of easy production line manufacture and cheap and of profitable industrial exploitation; such a wrapping lends itself especially to the transplantation of plants in large numbers and to distant destinations.

There will now be described, in order to illustrate the features which have just been mentioned, a preferred embodiment but which is in no way limiting, with reference to the accompanying drawing in which, FIG. 1 shows the flat blank of a root-ball wrapping according to the invention, this blank having received local reinforcements.

Figure 2:
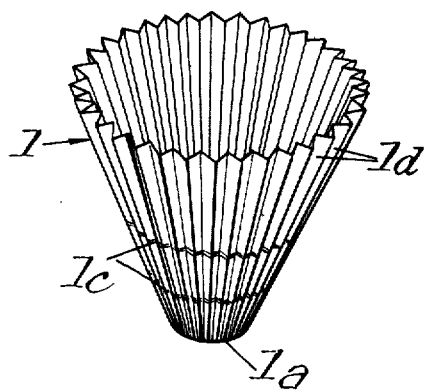

FIG. 2 shows the same wrapping after the final fabrication stage (formation of radial folds), said wrapping being ready for use.

Figure 3:
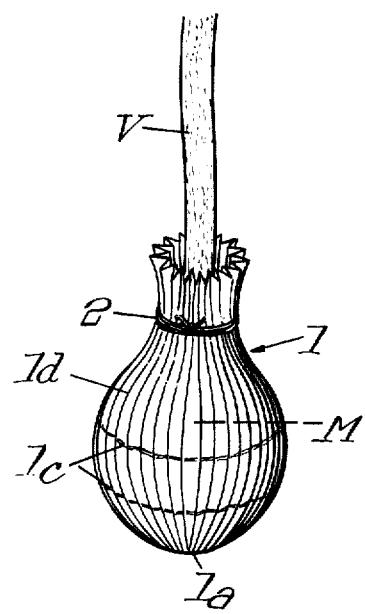

FIG. 3, lastly, shows the above-said wrapping surrounding the root-ball of a plant for the transplantation of the latter.

Shown in FIG. 1, is a flattened blank of a root-ball wrapping according to the invention.

This blank is essentially constituted by a flat disc 1 of synthetic non-woven material (polyamide, polyester, polyvinyl chloride or polyethylene) with thermally bonded continuous fibers.

The diameter of this disc can vary, for example, from 400 to 1800 mm according to the size of the root-balls to be wrapped, the unit weight of the above-said disc being variable, for example again, from 80 g/m$^2$ to 300 g/m$^2$.

The disc concerned comprises a reinforced bottom 1a, and radial 1b and coaxial circular 1c reinforcing lines, various local reinforcements being obtained by spraying or transfer of an emulsion of acrylic resin followed by hot polymerization in a press with a mould and countermould.

There is formed, due to this press, on the blank with thus formed local reinforcements, radial folds 1d (of the type of a laboratory filter) as shown in FIG. 2.

The root-ball wrapping is then adapted for use and lends itself to storage and transportation by stacking, such wrappings being easily nested within one another due to their frustoconic basket shape and to their radial elasticity (due to the lateral folds).

For the transfer of a plant V, it then suffices, as shown in FIG. 3, to surround the root-ball M of this plant by means of the wrapping illustrated in FIG. 3 and, after having applied against the root-ball M the folded peripheral zone of the wrapping, to bind the latter around the foot of the plant by means of a flexible tie 2.

Transplantation is then effected by simply placing the wrapped root-ball in the final planting hole intended to receive it, then by detaching the tie, to end by filling of the above-said hole, the wrapping eventually disaggregating in time in the host terrain.

Of course, if necessary or useful, the wrapping could be removed for planting.

As is self-evident and as emerges already from the foregoing, the invention is in no way limited to those of its types of application and embodiment which have been more especially envisaged; it encompasses, on the contrary, all modifications.

I claim:

1. A method for wrapping the root-ball of a plant comprising placing a non-woven wrapping of a material comprising a plurality of randomly distributed fibers and having a substantially circular shape around the root-ball so that the wrapping conforms to the shape of the root-ball and the peripheral edges of the wrapping surround the stem-base of the plant and fixing the wrapping in place using a flexible tie to bind the wrapping together in an area adjacent the peripheral edges of the stem-base of the plant.

2. A method for wrapping the root-ball of a plant as claimed in claim 1 wherein said wrapping is shaped into the form of an open-ended frusto-conic container prior to being placed around the root-ball.

3. A method for wrapping the root-ball of a plant as claimed in claim 2 wherein the wrapping shaped into the form of an open-ended frusto-conic container is locally reinforced prior to being placed around the root-ball.

4. A method for wrapping the root-ball of a plant as claimed in claim 3 wherein said reinforcement is provided in the bottom of said frusto-conic container.

5. A method for wrapping the root-ball of a plant as claimed in claim 3 wherein said reinforcement is provided in the form of radial ribs.

6. A method for wrapping the root-ball of a plant as claimed in claim 3 wherein said reinforcement is provided in the form of concentrically arranged circular lines of reinforcement.

7. A method for wrapping the root-ball of a plant as claimed in claim 2 wherein the wrapping shaped into the form of an open-ended frusto-conic container is radially folded prior to being placed around the root-ball.

8. A method for wrapping the root-ball of a plant as claimed in claim 2 wherein said non-woven wrapping comprises a polymer selected from the group consisting of vinyl acetate emulsions, acrylic polymer emulsions, phenolic resin solutions, and urea-formaldehyde resin solutions.

* * * * *